United States Patent [19]
Fritz et al.

[11] Patent Number: 5,688,084
[45] Date of Patent: Nov. 18, 1997

[54] MACHINE TOOL

[75] Inventors: Hermann Fritz, Mutlangen; Hans Staiger, Goeppingen; Friedrich Winckler, Schwaebisch-Gmuend, all of Germany

[73] Assignee: Max Rhodius GmbH, Weissenburg, Germany

[21] Appl. No.: 454,424

[22] Filed: May 30, 1995

Related U.S. Application Data

[63] Continuation of Ser. No. 55,686, Apr. 29, 1993, abandoned.

[30] Foreign Application Priority Data

Mar. 10, 1993 [DE] Germany .................. 43 07 482.0

[51] Int. Cl.⁶ .................. B23C 1/02; B23Q 15/013; H02K 41/02; H02P 5/46
[52] U.S. Cl. .................. 409/202; 310/13; 318/618; 408/234; 409/183; 409/191; 409/235; 451/11; 483/58
[58] Field of Search .................. 483/7, 14, 10, 483/36, 31, 58; 29/33 P, 563, 64, 56.5, 33 M, 741, 755; 310/13, 12; 83/71; 269/73; 408/3, 129, 234; 318/135; 451/11, 5; 409/141, 164, 183, 190, 191, 202, 212, 224, 225, 286, 235, 197

[56] References Cited

U.S. PATENT DOCUMENTS

| | | |
|---|---|---|
| 3,188,891 | 6/1965 | McFerren et al. |
| 3,998,127 | 12/1976 | Romen .................. 409/235 X |
| 4,030,527 | 6/1977 | Roch .................. 29/565 |
| 4,033,386 | 7/1977 | Wood .................. 29/755 |
| 4,171,493 | 10/1979 | Beimer et al. .................. 310/13 |

(List continued on next page.)

FOREIGN PATENT DOCUMENTS

| | | |
|---|---|---|
| 0 343 949 | 11/1989 | European Pat. Off. |
| 2907050 | 8/1980 | Germany. |
| 33 20 738 | 12/1984 | Germany. |
| 241 220 | 12/1986 | Germany. |
| 3620741 | 1/1987 | Germany. |
| 62-34 745 | 2/1987 | Japan. |
| 2194907 | 3/1988 | United Kingdom. |

OTHER PUBLICATIONS

*Patent Abstracts of Japan*, vol. 8, No. 2 (M–266), Jan. 7, 1984, Patent No. 58-165950.
*Patent Abstract of Japan*, vol. 10, No. 333 (M–534), Nov. 12, 1986, Patent No. 61-136753.
*Patent Abstracts of Japan*, vol. 14, No. 10 (M–917), Jan. 10, 1990, Patent No. 1-257544.
*Patent Abstracts of Japan*, vol. 14, 315 (M–995), Jul. 6, 1990, Patent No. 2-106247.
R. Hagl, "Elektrische Direktantriebe fur Werkzeugmaschinen und Industrieroboter," *Elektrische Antriebe, Antriebstechnik* 31 (1992) No. 4.
Spec Sheet—KraussMaffei Automationstechnik (undated).
Brochure—"Excellence in Motion," Anorad Corporation (undated).

(List continued on next page.)

*Primary Examiner*—William R. Briggs
*Attorney, Agent, or Firm*—Barry R. Lipsitz; Ralph F. Hoppin

[57] ABSTRACT

To improve a machine tool, comprising a machine frame, a workpiece holder arranged on the machine frame for a workpiece to be machined, a tool holder arranged on the machine frame for receiving a tool and at least one drive with a slide for executing a relative movement between the tool and the workpiece in the direction of at least one axis, such that it allows as high dynamics as possible, it is proposed that the drive comprise electric linear motors aligned parallel to the axis and spaced from one another in a transverse direction, that the slide extend between the two linear motors, and that a control be provided for simultaneously operating the linear motors for displacement of the slide.

29 Claims, 8 Drawing Sheets

U.S. PATENT DOCUMENTS

| | | |
|---|---|---|
| 4,172,229 | 10/1979 | Guimbal ............................ 310/13 |
| 4,286,197 | 8/1981 | Eberhard et al. .................. 318/135 X |
| 4,382,395 | 5/1983 | Haar .................................... 83/71 |
| 4,505,464 | 3/1985 | Chitayat ............................ 409/235 X |
| 4,512,068 | 4/1985 | Piotrowski ........................ 29/33 P |
| 4,560,911 | 12/1985 | Chitayat . |
| 4,595,870 | 6/1986 | Chitayat . |
| 4,606,489 | 8/1986 | Steinhart et al. ................ 318/618 |
| 4,704,792 | 11/1987 | Itagaki et al. .................... 29/741 |
| 4,733,143 | 3/1988 | Chitayat . |
| 4,742,609 | 5/1988 | Neumann . |
| 4,749,921 | 6/1988 | Chitayat . |
| 4,761,573 | 8/1988 | Chitayat . |
| 4,798,985 | 1/1989 | Chitayat . |
| 4,812,725 | 3/1989 | Chitayat ............................ 318/625 |
| 4,834,353 | 5/1989 | Chitayat ............................ 310/13 X |
| 4,839,545 | 6/1989 | Chitayat ............................ 310/12 |
| 4,890,241 | 12/1989 | Hoefman ........................... 409/202 X |
| 4,985,651 | 1/1991 | Chitayat ............................ 310/12 |
| 4,987,668 | 1/1991 | Roesch ............................... 409/212 X |
| 5,120,034 | 6/1992 | Van Engelen ..................... 269/73 |
| 5,172,464 | 12/1992 | Kitamura et al. ................ 29/563 |
| 5,183,374 | 2/1993 | Line .................................... 409/235 X |
| 5,203,061 | 4/1993 | Hamada ............................. 29/33 M |
| 5,250,880 | 10/1993 | Chesney ............................ 409/141 |
| 5,265,986 | 11/1993 | Prokopp ............................ 408/3 |
| 5,321,874 | 6/1994 | Mills et al. ........................ 409/164 X |
| 5,346,345 | 9/1994 | Jerzycke et al. .................. 409/235 |

OTHER PUBLICATIONS

Brochure—"Linear Servo Motors," Anorad Anoline Series, Anorad Corporation (©1993).

Brochure—"Anoline Linear Motors," Anorad Corporation (Mar. 1990).

W. Philipp, "Linear-Direktantriebe hoher Genauigkeit und Dynamik," Konstruktion, No. 43 (1991), pp. 425–429.

G. Pritschow, et al., "Linear-Asynchronmotoren fur hochdynamische Linearbewegungen," Werkstattstechnik, No. 79 (1989), pp. 647–650.

W. Philipp, "Linearmotoren fur Werkzeugmaschinen," Technica, No. 14/91, pp. 28–32.

MACHINE TOOL

This application is a continuation of commonly assigned, U.S. patent application Ser. No. 08/055,686 filed Apr. 29, 1993, abandoned.

BACKGROUND OF THE INVENTION

The invention relates to a machine tool comprising a machine frame, a workpiece holder arranged on the machine frame for a workpiece to be machined, a tool holder arranged on the machine frame for receiving a tool and at least one drive with a slide for executing a relative movement between the tool and the workpiece in the direction of at least one axis.

In the machine tools known so far, the drive comprises, as a rule, a motor which rotatingly drives a spindle with a spindle nut for executing a relative movement along the axis.

With such a rotating drive, the dynamics are limited on account of the rotational speed possible for the drive motor and the spindle.

The object underlying the invention is, therefore, to so improve a machine tool of the generic kind that it allows as high dynamics as possible.

SUMMARY OF THE INVENTION

This object is accomplished in accordance with the invention with a machine tool of the kind described at the beginning by the drive comprising two electric linear motors aligned parallel to the axis and spaced from one another in a transverse direction, by the slide extending between the two linear motors, and by a control being provided for simultaneously operating the linear motors for displacement of the slide.

With the inventive concept of using two linear motors aligned parallel to the axis and simultaneously employed to displace the slide, high dynamics are achievable for driving the slide because the limitations usually prevailing with rotating spindle drives no longer exist. Furthermore, the problems with play, elasticity, friction and wear which commonly occur with the known spindle drives are eliminated.

Special advantages apart from the high acceleration and the high speeds are large displacement paths and exact positioning.

The use of two simultaneously operated linear motors offers additional advantages because these provide in a simple way particularly high acceleration forces for highly dynamic movement of the slide.

The two linear motors can be operated in many different ways.

One advantageous solution provides the possibility of operating the two linear motors jointly as a single NC-axis. However, in spite of the joint activation as NC-axis, it is advantageous for separate power supplies to be provided. As far as control technology is concerned, this possibility can be implemented at reasonable cost.

As an alternative to this, provision is made for the two linear motors to be activatable as NC-axes independently of one another. This means that each of the linear motors has an NC-axis-control of its own and a power supply of its own. This has the advantage that the movements of the two linear motors can be attuned better to one another.

This is possible in a particularly advantageous way when each linear motor has a position measuring system of its own associated with it.

In particular, parallel displacement of the slide is then achievable by active control of the linear motors so that there are essentially no more transverse forces acting on guides of the slide to cause tilting of the slide.

The linear motors can be constructed in many different ways. It is expedient for single-cam linear motors to be used.

In a preferred solution, the linear motors comprise primary and secondary parts aligned parallel to a plane as linear motor parts.

A particularly compact construction is obtained with the use of such linear motors when the plane in which the linear motor parts extend runs transverse to the transverse direction.

To enable the heat of the linear motors to be conducted away well, it is, furthermore, advantageous for the linear motors to be respectively arranged on both sides and in outer regions of the slide and a slide support.

The arrangement of the linear motors is particularly advantageous when these are arranged at respective opposite outer sides of the slide support or the slide. This solution enables optimum removal of the heat generated by the linear motors into the environment and, at the same time, a slide or slide support design which is as compact as possible in the direction of the respective axis.

In the explanation of the embodiments so far, the guidance of the slide was not described in further detail. It is, for example, conceivable to guide the slide on a main guide. However, it is particularly advantageous, especially for the accuracy and exactness of the guidance of the slide, for the slide to be guided on two main guides extending in parallel spaced relation to one another.

To obtain a compact design and, on the other hand, as explained above, to provide the possibility for optimum cooling of the linear motors, provision is advantageously made for the main guides to be arranged between the linear motors.

With this external arrangement of the linear motors with respect to the main guides, stability problems could arise on account of the forces acting between the linear motor parts.

These stability problems are advantageously solved by the respective linear motors lying between a main guide and an additional guide, respectively, with the two guides acting between the slide and the respective slide support. The provision of the additional guides thus enables stable guidance of the linear motor parts relative to one another and sufficient rigidity with as small a mass as possible of slide and slide support and hence high dynamics.

To achieve optimum cooling, provision is preferably made for the linear motors to comprise cooled primary and secondary parts.

Such cooling can be carried out in many different ways. One embodiment preferably makes provision for the cooling of the primary and secondary parts to be carried out by cooling channels in holding elements for the primary and secondary parts so that these are coolable by direct contact with the holding elements respectively carrying the cooling channels.

A coolant which is coolable to a defined temperature by a cooling device preferably flows through the cooling channels.

In the explanation of the embodiments so far, it was merely explained how optimum dynamics of the slide are achievable. With the use of electric linear motors both acceleration and braking are possible with these linear motors.

In spite of this, it is advantageous, especially for safety reasons, for the slide to be additionally fixable by a braking device.

The braking device is preferably designed as a mechanically acting braking device. In particular, the braking device serves as automatic braking device to automatically brake the slide when predeterminable positions of the slide are reached.

Provision is preferably made for the braking device to be actuatable by an end position switch which thus brakes and fixes the slide independently of the activation of the linear motors when an end position fixed by the end position switch is reached.

As an alternative or supplement to this, provision is advantageously made for the braking device to be provided as a safety device in the event of failure or an emergency stop.

The braking device is then preferably actuatable by a failure switch or emergency stop switch so that in the event of failure of the electric power supply for the linear motors or actuation of an emergency stop switch, the braking device brakes and fixes the slide.

It is particularly expedient, especially for effectively applying as high braking forces as possible, for the slide to be fixable by two braking devices spaced from one another in the transverse direction. In particular, effective braking of the slide is thus possible and abrupt braking thereof is avoided.

In the description of the embodiments so far, the design of the slide support was not described in further detail. In an embodiment which is advantageous particularly with respect to its stability and resistance to distortion, provision is made for the slide support to be designed as a yoke.

The slide support can, for its part, be part of a slide which is movable relative to the machine frame or it can be part of the machine frame. In this case, provision is preferably made for the slide support designed as a yoke to form a stand of the machine frame which is seated on a machine bed.

In an advantageous embodiment of an inventive machine tool, provision is made for the tool holder to be held on a slide displaceable in one direction, and for, in particular, the workpiece holder to be held on a slide displaceable in another direction transverse to the one direction.

The workpiece holder is preferably rotatable by a rotary drive about an axis relative to the machine frame so that the workpiece can be brought into various rotary positions about an axis of rotation or made to execute a rotary movement—for example, in the fashion of a spindle—about this axis.

A particularly expedient solution makes provision for the rotary drive to be designed as an NC-axis so that rotary movements about precisely determinable angles or also rotary machinings can be carried out.

It is particularly advantageous for the rotary drive to comprise a direct drive, i.e., for there to be no gearing connected between a drive motor and the workpiece holder.

The advantages of such a direct drive are to be seen in the elimination of gear problems such as play, friction, etc. and the achievable high dynamics.

In combination with a direct drive, the providing of the rotary drive with a direct measuring system for detecting the rotary positions of the workpiece holder represents a particularly preferred solution as far as the thus achievable precision is concerned.

To enable exact positioning and fixing of the workpiece holder in individual rotary positions, provision is preferably made for the rotary drive to comprise a braking device for fixing the workpiece holder for machining of the workpiece in each rotary position.

It is preferable—particularly when the machine tool is designed as a machining center—for the rotary drive to be designed as a rotary table with which the workpiece holder is rotatable about a vertical axis.

The workpiece holder is preferably fixable in and releasable from a support on the rotary table so that the workpiece is fixed together with the workpiece holder on the rotary table, machined and then transported further together with the workpiece holder.

The workpiece holder is preferably hydraulically clampable in the support on the rotary table.

It is preferable for the workpiece holder to be designed as a pallet on which the workpiece is clamped.

Particularly in the case of a rotary table rotatable about a vertical axis, provision is preferably made for this rotary table to sit on a slide which, for its part, is displaceable on a longitudinal bed of the machine frame comprising a slide support.

So far, no further details have been given about the arrangement of the tool. It is, for example, conceivable to arrange a stationary tool on the slide and perform, for example, rotary machining with the tool.

As an alternative to this, it is conceivable, particularly when the inventive machine tool is a machining center, for a tool spindle for receiving the tool to be arranged on the slide and for the tool to thus be a rotatingly driven tool.

In this case, the tool spindle is preferably arranged on the slide such that it extends through a central opening of the slide support designed as a yoke. If this slide support is, in turn, part of a slide and guided on a further slide support which is designed as a yoke, provision is then advantageously made for the tool spindle to extend through the central openings of both yokes.

An advantageous version of an inventive machine tool comprises, in particular, a first slide which is movable along a first axis and is guided on a first slide support. This slide support is, in turn, part of a slide which is displaceable along a second axis transversely to the first axis and is, for its part, guided on a second slide support. This second slide support is part of the machine frame and is seated, in particular, in the form of a stand, on a machine bed.

A third axis extending transversely to the first and second axes is formed by a slide displaceable along a longitudinal bed carried by the machine bed. This division of the axes allows optimum stability and, in particular with linear drives, optimum distribution of the masses in order to obtain as high dynamics as possible with all axes.

The longitudinal bed is preferably encompassed by the machine bed.

A particularly stable construction is obtained when two Y-shaped legs adjoin the longitudinal bed and the legs are connected to the stand at their ends which face away from the longitudinal bed.

In a further inventive embodiment, provision is made for a work area of the machine tool to be enclosed by a cell.

To allow highly dynamic movement of the slide, provision is made for a delimitation of the cell to be formed by at least one shield held on the slide and extending away from the latter in its direction of movement, with the shield reaching in all the axis positions of the slide in the direction in which it extends at least as far as a delimitation of the work area in the direction in which it extends.

It is particularly advantageous for the delimitation of the cell to be formed by two shields extending in opposite directions.

In the case of a double-slide system, provision is preferably made for a tool or workpiece holder carried by a second slide to extend through a movement gap between these two shields.

To enable optimum covering of this movement gap in a way suitable for highly dynamic movements, provision is preferably made for it to also be covered at least in one direction by a shield movable by the slide.

This shield can be guided in any chosen way. It is preferable for the shield to be guided by longitudinal guides on both sides of the movement gap.

In the case of a compound slide system, a particularly advantageous embodiment of an inventive machine tool makes provision for two shields extending in opposite directions to be provided on one compound slide and for a shield extending in one direction to be provided on the other compound slide, with a telescope-type cover arranged in the other direction, and for the shields and the telescope-type cover to form a delimitation of the cell.

So far, no further details were given about the design of the shields. To achieve good stability, a shield is designed as light-weight building panel comprising a front and a rear metal sheet and between these a reinforcement element with cavities therein.

It is expedient for the reinforcement element to be a corrugated metal sheet. It is, however, also conceivable for it to be in the form of a honeycomb structure, etc.

A solution in which the front and rear sheets are made of aluminum is particularly advantageous. It is even better for the reinforcement element to also be made of aluminum and it is preferable for the reinforcement element and the sheets to be adhesively connected to one another.

A further advantageous embodiment comprises a tool magazine arranged outside of the cell.

The tool magazine is preferably in the form of a magazine wheel with tool receptacles along its circumference.

To enable tool exchange with the tool holder as simply and as quickly as possible, provision is made in the case of a cell surrounding the work area, for a side wall to be provided with a swing door.

This swing door is preferably designed as a double-swing door with two door leaves.

The door leaves can be opened in any chosen way. Since very quick entry through the double-swing door requires as quick opening of the two door leaves as possible, provision is preferably made for the door leaves to be adapted to be brought into an open position by being acted upon by the tool holder.

For this purpose, damping elements are preferably provided on the door leaves to reduce the forces of acceleration applied to the door leaves by the tool holder.

To bring the door leaves back into their closed position again and keep them in it in as simple a way as possible, provision is preferably made for the door leaves to be acted upon by spring elements in the direction of their closed position.

Since very quick opening of the two door leaves involves the danger of these springing back from their open position when they strike a stop, provision is preferably made for each door leaf to be provided with a braking device, preferably in the form of a friction braking device, which brakes the free movability of the door leaves.

Further features and advantages of the inventive solution are the subject matter of the following description and the appended drawings of several embodiments.

DETAILED DESCRIPTION OF THE INVENTION

Figure 1:
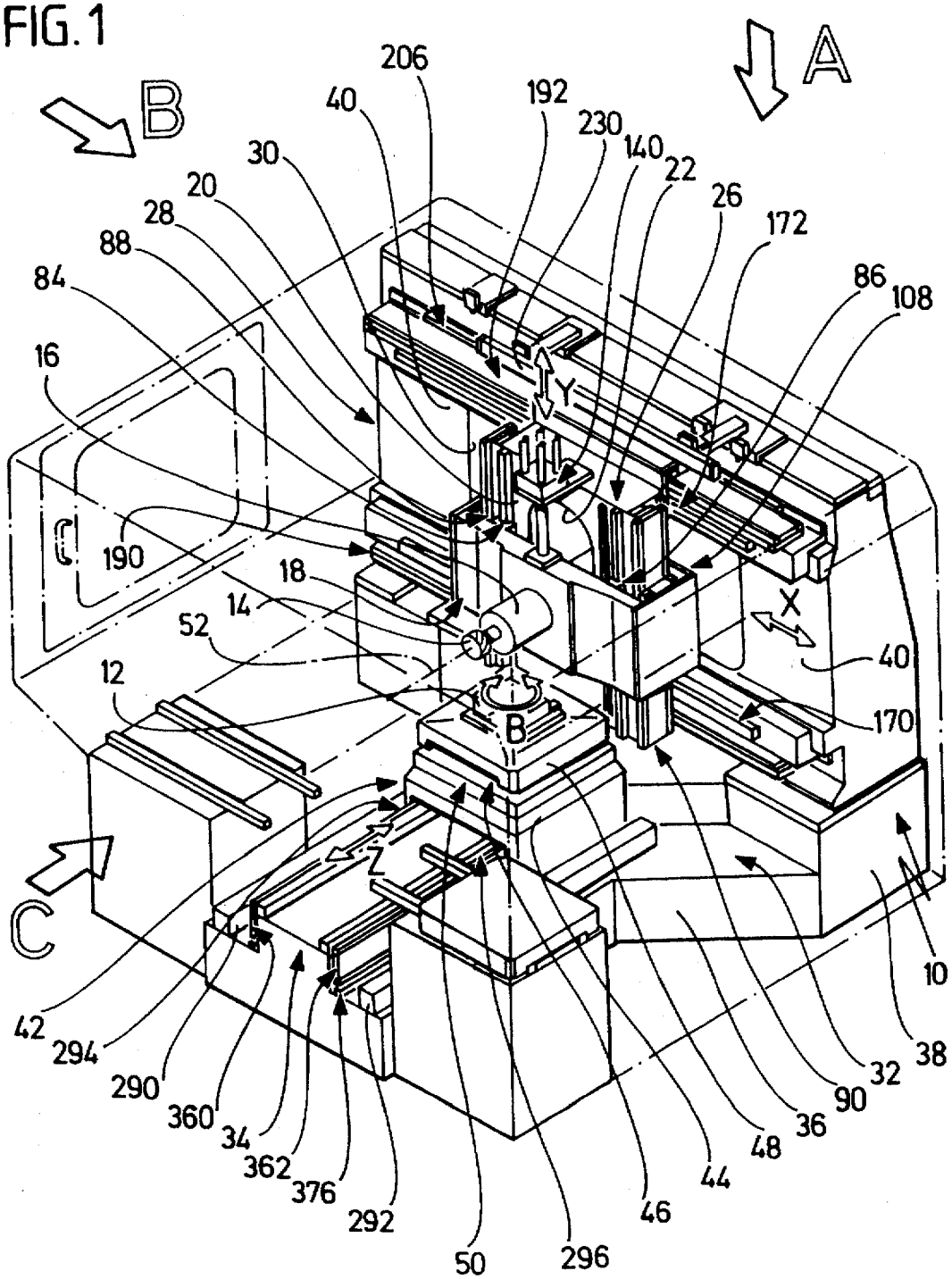
FIG. 1 a perspective overall view of a machine tool according to the invention.

A first embodiment of an inventive machine tool illustrated in FIG. 1 comprises a machine frame designated in its entirety 10 on which a workpiece 12 is positionable. For machining the workpiece 12 with a tool 14, the tool 14 is held in a tool spindle 16 which, for its part, is displaceable in an X- and a Y-direction on the machine frame 10. The workpiece 12 is also movable in a Z-direction relative to the tool spindle 16 and perpendicular to the X- and Y-axes so that, in all, the workpiece 12 and the tool 14 are movable along three axes extending perpendicular to one another, namely the X-, Y- and Z-axes, for machining the workpiece 12.

To enable movement of the tool spindle 16 along the X- and Y-axes, the tool spindle 16 is held on a Y-slide 18 which, for its part, is displaceable on a slide support 20, designed as a yoke with a central opening 22, in the Y-direction. The tool spindle 16 extends with a rearward section 24 facing away from the tool 14 (FIGS. 2 and 3) through the central opening 22. The central opening 22 is, therefore, designed such that the tool spindle 16 is movable along its maximum Y-path of displacement, predetermined by the movability of the Y-slide 18 relative to the slide support 20, in an unimpeded way without colliding with rims of the central opening 22.

The slide support 20 is encompassed by an X-slide 26 which, for its part, is held on a stand 28 for displacement along the X-axis. The stand 28 is also designed as a yoke and has a central opening 30 through which the rearward part of the tool spindle 24 extends, with the central opening 30 being designed such that the tool spindle 16 is movable therein in a collision-free manner in all possible positions along the X- and Y-axes.

The stand 28 sits as part of the main frame 10 on a machine bed 32 which is likewise encompassed by the machine frame 10. The machine bed 32 comprises a longitudinal bed 34 which extends parallel to the Z-axis and hence perpendicular to a plane spanned by the X-axis and the Y-axis away from the stand 28. For stable connection of the stand 28 to the longitudinal bed 34, the machine bed 32 has two legs 36 protruding in Y-shaped configuration from the longitudinal bed, with the stand 28 seated on the ends 38 of the legs 36 that face away from the longitudinal bed 34 and the ends 38 lying below vertical yoke beams 40 of the stand 28.

Guided on the longitudinal bed 34 parallel to the Z-axis is a Z-slide 42 which carries a rotary drive 44 with which the workpiece is rotatable about a B-axis.

The rotary drive 44 forms together with a support 46 for a workpiece holder 48 a rotary table designated in its entirety 50 for the workpiece holder 48 which is preferably designed as a pallet for holding the workpiece 12.

The B-axis lies parallel to the plane spanned by the X- and Y-axes and preferably extends perpendicular to a spindle axis 52 of the tool spindle 16.

Figure 2:
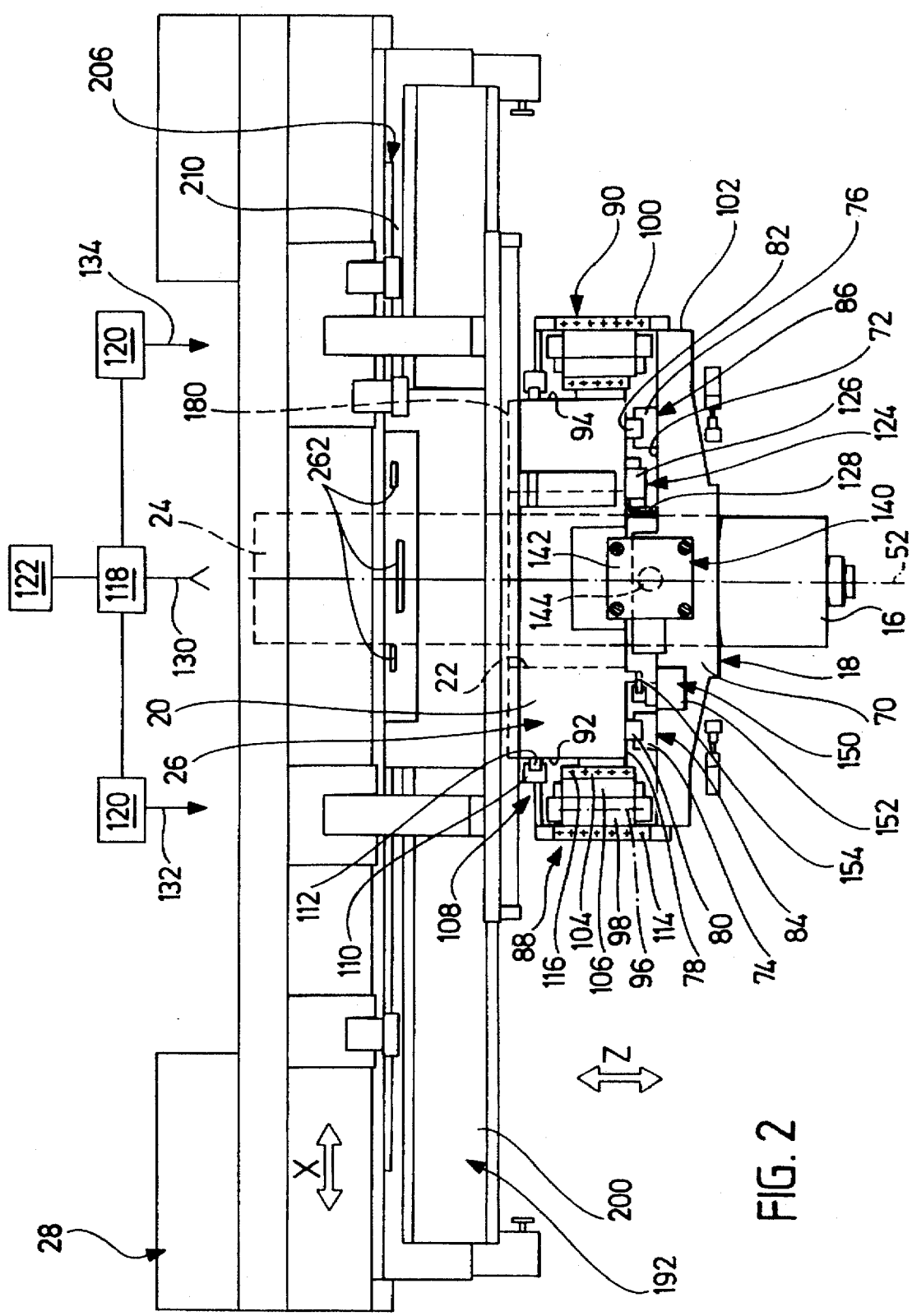
FIG. 2 a plan view in the direction of arrow A in FIG. 1.
Figure 3:
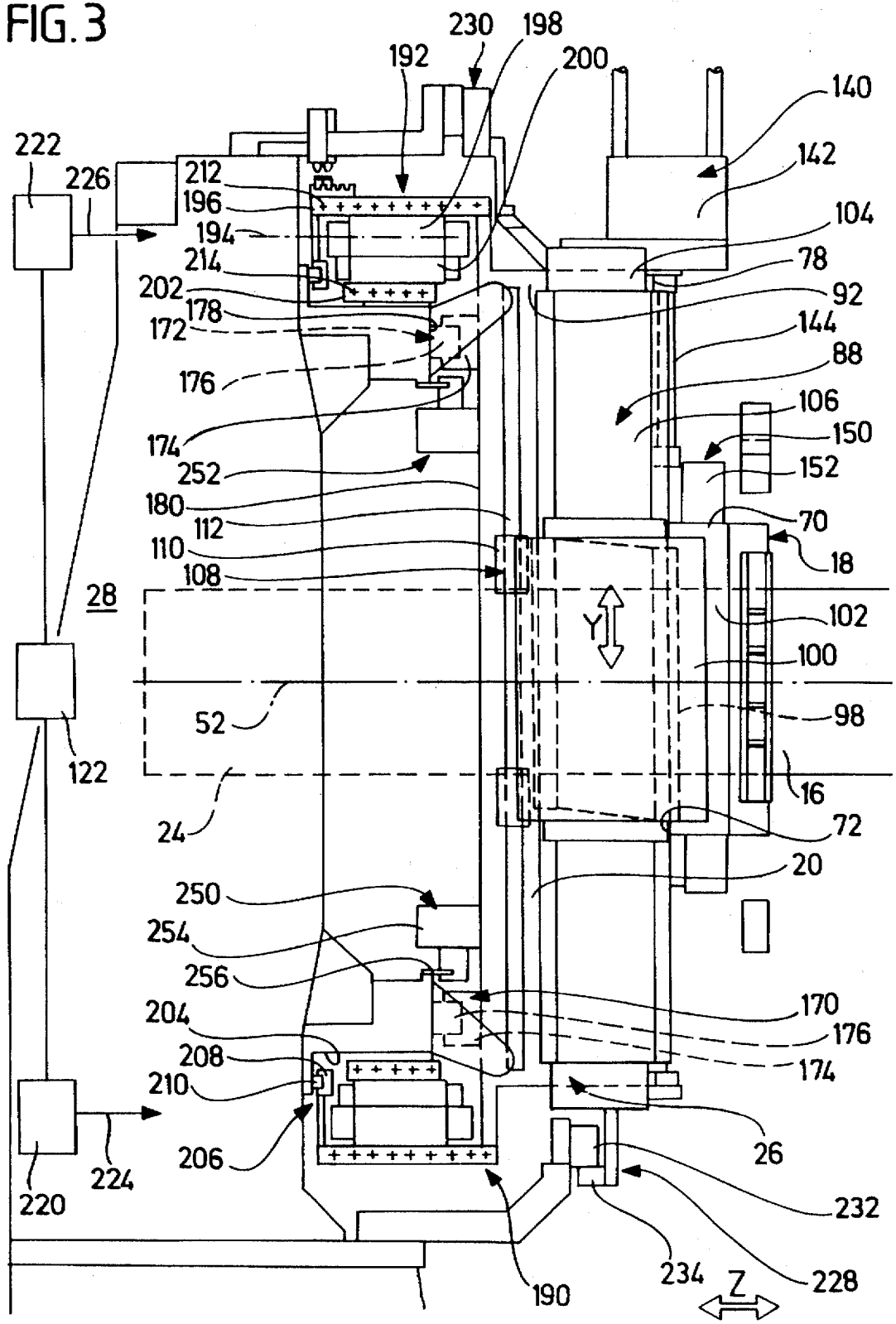
FIG. 3 a plan view in the direction of arrow B in FIG. 1.
Figure 4:
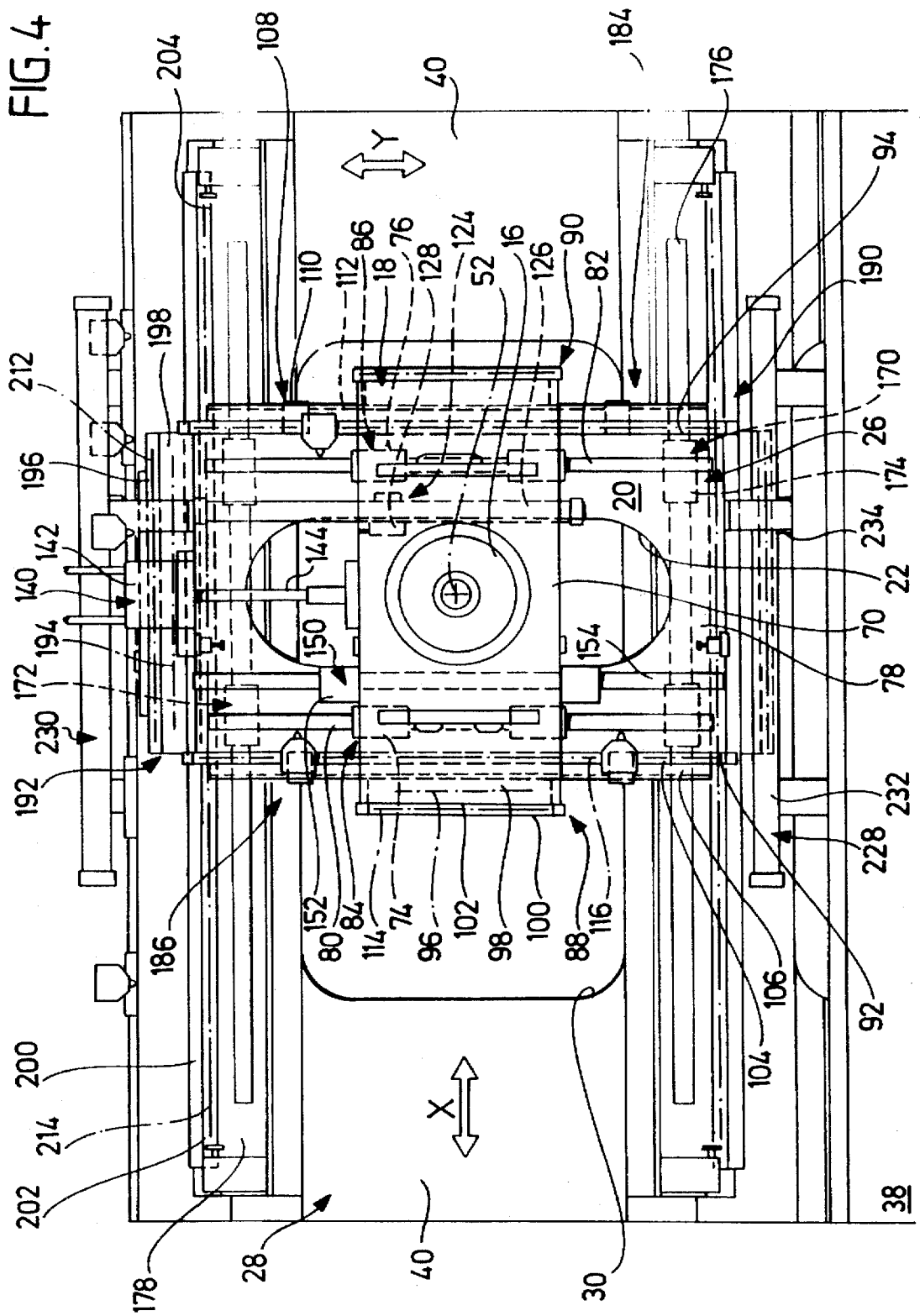
FIG. 4 a plan view in the direction of arrow C in FIG. 1.
Figure 5:
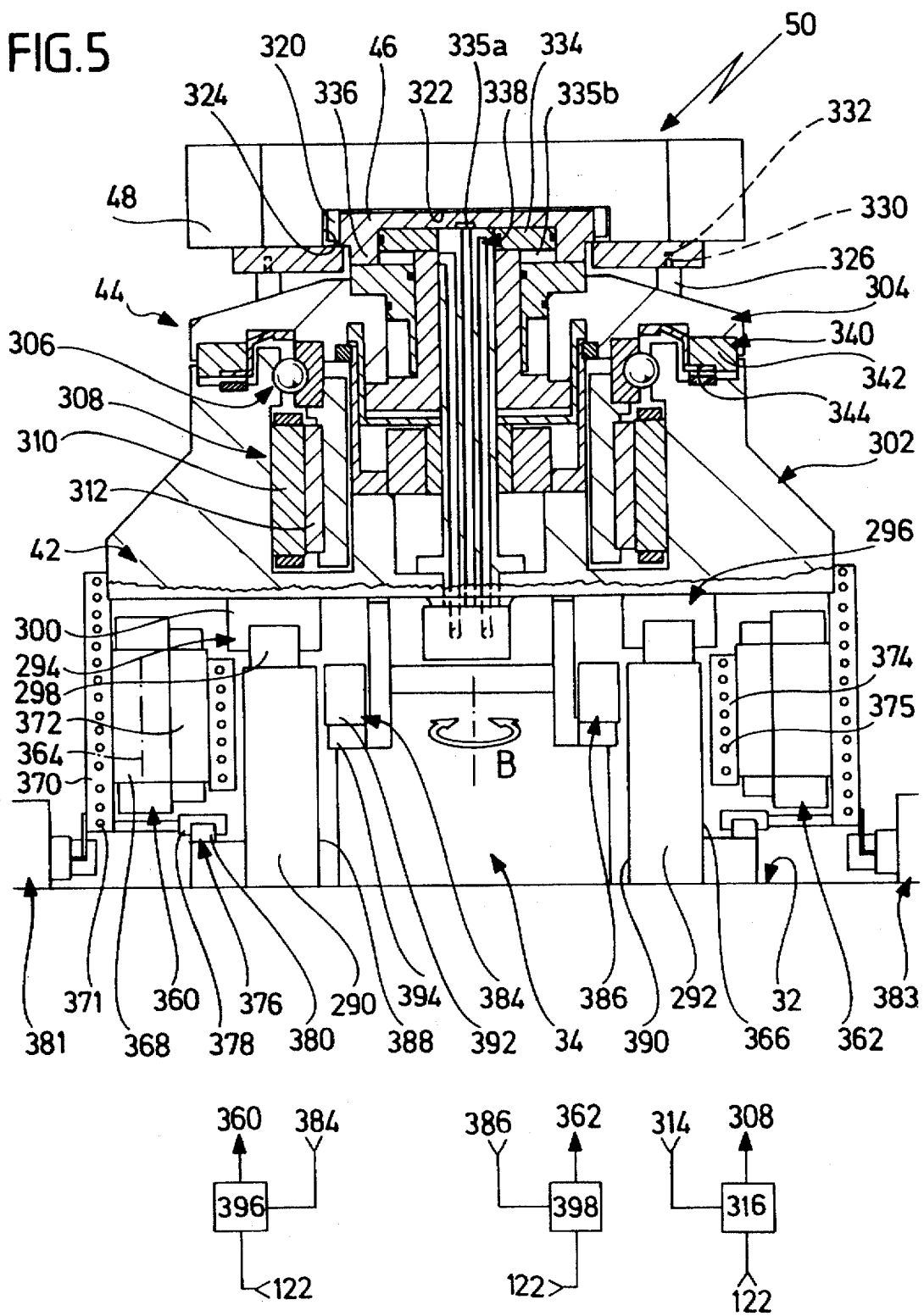
FIG. 5 a section through a Z-slide with a rotary drive.

As illustrated in FIGS. 2 and 3, the Y-slide 18 includes a bridge 70 which carries the tool spindle 16. The bridge 70 carries on a rear side 72 guide carriages 74 and 76 which are guided on guide rails 80 and 82 spaced from one another on a front side 78 of the slide support 20 and extending parallel to the Y-axis. The guide carriages 74 and 76 form with the guide rails 80 and 82 main guides 84 and 86 for the Y-slide 18 which are preferably arranged symmetrically with the spindle axis 52.

Linear motors 88 and 90, respectively, are arranged beside the main guides 84 and 86, respectively, more particularly, on the sides facing away from the tool spindle 16. Both of these serve jointly to displace the Y-slide 18 in the direction of the Y-axis and to do so are operated simultaneously.

The two linear motors 88 and 90 are each arranged at the side of the slide support 20, more particularly, in such a way that they lie beside a side face 92 and 94, respectively, of the slide support 20 and extend with their winding planes 96 parallel to the Y-direction and parallel to the Z-direction.

Each of the linear motors includes a primary part 98 which is mounted on a holding flange 100 of the Y-slide 18 on a side facing the side face 92 and 94, respectively. The holding flange 100 extends from an outer end 102 of the bridge 70 approximately parallel to the side face 94 and overlaps it.

A secondary part 106 is arranged by means of a supporting element 104 on the slide support 20 facing the primary part 98. The secondary part 106 is seated on the supporting element 104 on a side facing the holding flange 100, and the supporting element 104 is held on the side face 94.

To support the holding flange 100 against the forces acting between the primary part 98 and the secondary part 106 perpendicular to the winding plane 96, the holding flange 100 is guided on its side facing away from the bridge 70 by an additional guide 108 which comprises a guide carriage 110 connected to the holding flange 100 and a longitudinal guide 112 seated on the side face 94 and extending parallel to the Y-axis. This additional guide 108 thus guides the holding flange 100 precisely in defined alignment with the side face 94 of the slide support 20 and hence the primary part 98 at a defined spacing from the secondary part 106, more particularly, jointly with the main guides 84 and 86.

For cooling the primary part 98 and the secondary part 106 of each of the linear motors 88 and 90, cooling channels 114 and 116, respectively, are provided in the holding elements for these, i.e., in the holding flange 100 for the primary part 98 and in the supporting element 104 for the secondary part 106 so that both the primary part 98 and the secondary part 106 are coolable by the holding element respectively carrying these, i.e., the holding flange 100 and the supporting element 104. A coolant which is cooled down to a defined temperature by a cooling device flows through these cooling channels 114 and 116.

The two linear motors 88 and 90 are activated by a common control 118 provided for both linear motors 88 and 90 and constituting an NC-axis control, but with separate power supplies 120, the position along the Y-axis to be approached by the Y-slide 18 being specified by a superordinate machine control 122 of the control 118.

A Y-measuring system 124 extending parallel to the Y-axis is provided for detecting the actual position of the Y-slide. The Y-measuring system 124 is seated on the front side 78 of the slide support 20, more particularly, between the tool spindle 16 and the main guide 86, and comprises a position transducer 126 and a position sensor 128, the position transducer 126 being seated on the slide support 20 and the position sensor 128 connected to the bridge 70.

The Y-measuring system 124 detects the position of the Y-slide 18 relative to the Y-axis and reports it via a line 130 to the control 118. This actual Y-position is compared with the Y-position to be approached as specified by the machine control 122, which results in a winding current for the respective linear motor 88 and 90, respectively, flowing via a supply line 132 and 134, respectively, to the respective linear motor 88 and 90, respectively.

To increase the dynamics of the movement of the Y-slide 18 in the direction of the Y-axis, the gravity acting on the Y-slide 18 on account of the mass of the tool spindle 16 and the Y-slide 18 is compensated by a pneumatic counterweight 140 which comprises a pneumatic cylinder 142 which is held on the slide support 20 and the piston rod 144 of which engages the bridge 70 preferably in the region of the tool spindle 16. The pneumatic cylinder 142 is acted upon by pressure in such a way that it compensates to a considerable extent the gravity acting on the Y-slide 18 so that essentially only the acceleration forces have to be applied by the linear motors 88 and 90.

To enable additional fixing of the Y-slide in defined positions along the Y-axis, a brake 150 is also provided between the main guide 84 and the tool spindle 16. The brake 150 comprises a brake member 152 which actuates a brake block and, for its part, is held on the bridge 70 and a brake rail 154 which is held on a front side 78 of the slide support 20.

The brake 150 serves to fix the Y-slide 20 when an emergency stop switch is actuated or there is a power failure, and, in the latter case, the brake 150 is actuated automatically.

The X-slide 26 encompassing the slide support 20 is mounted, for its part, for displacement on the stand 28 of yoke-type design, more particularly, by means of two main guides 170 and 172, each of which includes a guide carriage 174 and a guide rail 176. The guide rail 176 is seated on a front side 178 of the stand 28, while the guide carriage 174 is seated on a rear side 180 of the X-slide 26.

The two main guides 170 and 172 are aligned parallel to the X-axis and extend in spaced relation to one another, preferably in the region of two cross beams 184 and 186, respectively, of the yoke-type stand 28 forming a slide support.

Two linear motors 190 and 192 are provided for driving the X-slide 26, with their winding plane 194 extending parallel to the X-direction and parallel to the Z-direction. The two linear motors 190 and 192 likewise lie alongside the cross beams 184 and 186, with the lower linear motor 190 located below the lower cross beam 184 and the upper linear motor 192 located above the upper cross beam 186.

Each of the linear motors 190 and 192 includes a primary part 198 carried by a holding flange 196 arranged on the X-slide 26. Opposite the primary part 198 is a secondary part 200 which, for its part, is held by a supporting element 202 which is arranged on a side face 204 of the cross beams 184 and 186, respectively. The holding flange 196 likewise overlaps the side face 204 of the respective cross beam 184 and 186, respectively.

Furthermore, an additional guide 206 including a guide carriage 208 and a guide rail 210 is similarly provided for supporting the holding flange 196. The guide carriage 208 is held on the holding flange 196 and the guide rail 210 on the respective cross beam 184 and 186, respectively. The additional guide 206 likewise engages an end of the respective holding flange 196 facing away from the X-slide 26 so that the respective linear motor 190 and 192, respectively, lies between the additional guide 206 and the respective main guide 170 and 172, respectively, and the primary part 198 is supported on both sides with respect to the secondary part 200 by the respective additional guide 206 and the respective main guide 170 and 172, respectively.

In the same way as described in connection with the linear motors 88 and 90, respectively, the holding flange 196 is provided with cooling channels 212 and the supporting element 202 with cooling channels 214 through which there flows coolant which is cooled down to a defined temperature by the cooling device.

Two controls 220 and 222, each with an associated power supply of their own for the respective linear motors 190 and 192, respectively, are provided for operating the two linear motors 190 and 192. The controls 220 and 222 supply the linear motors 190 and 192 with power via supply lines 224 and 226, respectively, with the position along the X-axis being specified by the super-ordinate machine control 122.

Two measuring systems 228 and 230 are provided for detecting the exact X-position of the X-slide 26 along the X-axis. The measuring system 228 is located close to the linear motor 190, preferably on the side thereof facing away from the stand 28 and the measuring system 230 close to the linear motor 192, preferably on the side thereof facing away from the cross beam 186.

Each of the two measuring systems 228 and 230, respectively, includes a position transducer 232 and a position sensor 234, the position transducer 232 being connected to the stand 28 and the position sensor 234 to the X-slide 26.

Associated with the control 220 for the linear motor 190 is the measuring system 228 which is located close to the latter, and associated with the control 222 for the linear motor 192 is the measuring system 230.

Owing to the large distance between the linear motors 190 and 192 in the direction of the Y-axis and hence also to the large distance between the measuring systems 228 and 230, the association of a respective measuring system of its own with each of the controls 220 and 222 serves to allow these two controls 220 and 222 to operate completely independently of one another as two separate NC-axis controls, but simultaneously, so that each linear motor 190 and 192, respectively, approaches in a controlled manner the X-position specified by the machine control 222 in accordance with the respective actual measured values of the associated measuring system 228 and 230, respectively. In this way, active parallel guidance of the X-slide 26, more particularly, parallel to the Y-axis, is achievable and so the parallel alignment of the X-slide 26 with the Y-axis is carried out in an actively controlled way.

Two brakes 250 and 252 are additionally provided for fixing the X-slide 26 in positions along the X-axis. Each of these comprises a brake member 254 with brake blocks and a brake rail 256, with the brake rail 256 of the brake 250 being held on the cross beam 184 and the brake rail of the brake 252 on the cross beam 186, while the brake members 254 of the two brakes 250 and 252 are seated on the rear side 180 of the X-slide 26.

Both brakes 250 and 252 are provided for fixing the X-slide when an emergency stop switch is actuated or a power failure occurs.

The longitudinal bed 34 comprises two supporting beams 290 and 292 extending in spaced relation to one another and parallel to the Z-axis. These form a slide support and carry main guides 294 and 296, respectively, for the Z-slide 42. Each of the main guides has a guide rail 298 resting on the supporting beam 290 and 292, respectively, and a guide carriage 300 displaceable on the guide rail 298 and held on the Z-slide 42.

The Z-slide 42 includes a housing 302 of the rotary drive 44 on which a rotor designated in its entirety 304 is mounted by means of a rotary bearing 306 for rotation about the B-axis.

The rotor 306 is driven directly by a motor designated in its entirety 308, the stator part 310 of which is mounted in the housing 302 and the rotor part 312 of which is seated rotatably on the rotor, the stator part 310 and the rotor part 312 being arranged between the rotary bearing 306 and the guide carriage 300 in the housing 302.

A rotary encoder 314 is arranged radially within the motor 308 for detecting the rotary positions of the rotor 304 relative to the housing 302. This rotary encoder 314 reports the actual rotary position of the rotor 304 relative to the housing 302 to a control 316 which, for its part, supplies the motor 308 with power via a supply line so that the rotary movements can be carried out as NC-controlled B-axis movements.

The individual rotary positions of the motor 308 are transmitted to the control 316 for the axis of rotation via the machine control 122.

The support 46 is provided on the rotor 304 for fixing the workpiece holder and has roller bearings 320 arranged in spaced relation to one another for supporting the workpiece holder on an underside 322. Furthermore, the roller bearings 320 engage grooves 324 of the workpiece holder so that by movement of the support 46 in the direction towards the housing 302, the workpiece holder can likewise be acted upon in this direction and positioned on rests 326 on the rotor 304. These rests 326 serve to center and precisely align the workpiece holder 48 relative to the rotor 304 to achieve exact positioning of the workpiece holder 48 relative to the rotor 304 and hence with respect to the B-axis and the Z-axis. The rests 326 preferably form bearing surfaces extending transversely to the B-axis and also include centering bolts 330 which engage corresponding centering bores 332 on the workpiece holder 48 to position the latter in a defined manner with respect to the B-axis on the rotor 304.

To move the support 46 towards the housing 302 or away from the latter, a top part of the rotor 304 is provided with a piston 334 which is held on the housing 302 and on which a cylinder 336 enclosed by the rotor 304 is guided for movement in the direction of the axis of rotation or B-axis. This cylinder 336 carries the support 46 with the roller bearings 320 and is displaceable by cylinder chambers 335*a* or 335*b* being acted upon with hydraulic medium.

The cylinder chambers 335*a* and 335*b* in the rotor 304 are supplied by a central, stationary feeder 338 extending through a piston rod of the piston 334. The feeder 338 extends from the housing 302 into the rotor 304 and at the level of the cylinder chambers 335*a* and 335*b* connects the cylinder chambers 335a and 335b to their hydraulic channels via rotary feeders.

A brake 340 is additionally provided for fixing the rotor 304 relative to the housing 302. The brake 340 comprises a brake member 342 and a brake flange 344, the brake flange 344 being rigidly connected to the rotor 304 and the brake member 342 being firmly seated on the housing 302.

With the brake 340 the rotary position of the workpiece 12 seated on the workpiece holder 48 is fixable for machining by the tool 14.

Two linear motors 360 and 362 are provided for displacing the Z-slide 42 along the Z-axis. Their winding planes 364 extend in a plane parallel to the Z- and Y-axes. The two linear motors 360 and 362 lie alongside the supporting beams in the region of side faces 366 facing away from one another.

Each of the linear motors 360 and 362 includes a primary part 368 which is held on a holding flange 370. The holding flange 370 is held, for its part, on the Z-slide and extends alongside the supporting beams 290 and 292, thereby overlapping their side faces 366. Arranged opposite the primary part 368 is a secondary part 372 which, for its part, is seated on a supporting element 374 which, in turn, is held on the respective side face 366.

Cooling channels 371 and 375, respectively, are also provided in the holding flange 370 and in the supporting element 374, with coolant flowing through them in the same way as for the X-axis or the Y-axis.

In the same way as for the Y-axis and the X-axis, the holding flange 370 is supported by an additional guide designated in its entirety 376 which comprises a guide carriage 378 and a guide rail 380, the guide rail 380 being connected to the respective supporting beam 290 and 292, respectively, and the guide carriage 380 being rigidly held on the holding flange 370.

The forces acting between the primary part 368 and the secondary part 372 are thus absorbed in the same way as for the Y-axis and the X-axis by the respective main guide 294 and 296, respectively, and the corresponding additional guide 376.

Brakes 381 and 383 are additionally provided for fixing the Z-slide 42. These preferably act between the longitudinal bed 34 and the holding flanges 370 and are constructed in the same way as brakes 250 and 252.

A measuring system 384 and 386, respectively, is associated with each of the linear motors 360 and 362 for detecting the movement of the Z-slide 42 along the Z-axis. The measuring systems are arranged on an inner side 388 and 390, respectively, of the respective supporting beams 290 and 292, respectively, in order to lie as close as possible to the respective linear motor 360 and 362, respectively.

Each of the measuring systems 384 and 386 comprises a position transducer 392 fixedly connected to the longitudinal bed 34 and a position sensor 394 connected to the Z-slide 42.

A control 396 and 398, respectively, is associated with each of the two linear motors 360 and 362 for operating these, and associated with each of these controls 396 and 398, respectively, is a position measuring system 384 and 386, respectively, for detecting the actual position in the Z-direction. The position to be driven to along the Z-axis is transmitted by the machine control 122 to the two controls 396 and 398 which then compare this with the actual positions detected by the measuring systems 384 and 386.

Both controls 396 and 398 operate independently of one another so that an active parallel alignment of the Z-slide relative to the X-axis can thereby be carried out exactly as described in connection with the controls 220 and 222.

Figure 6:
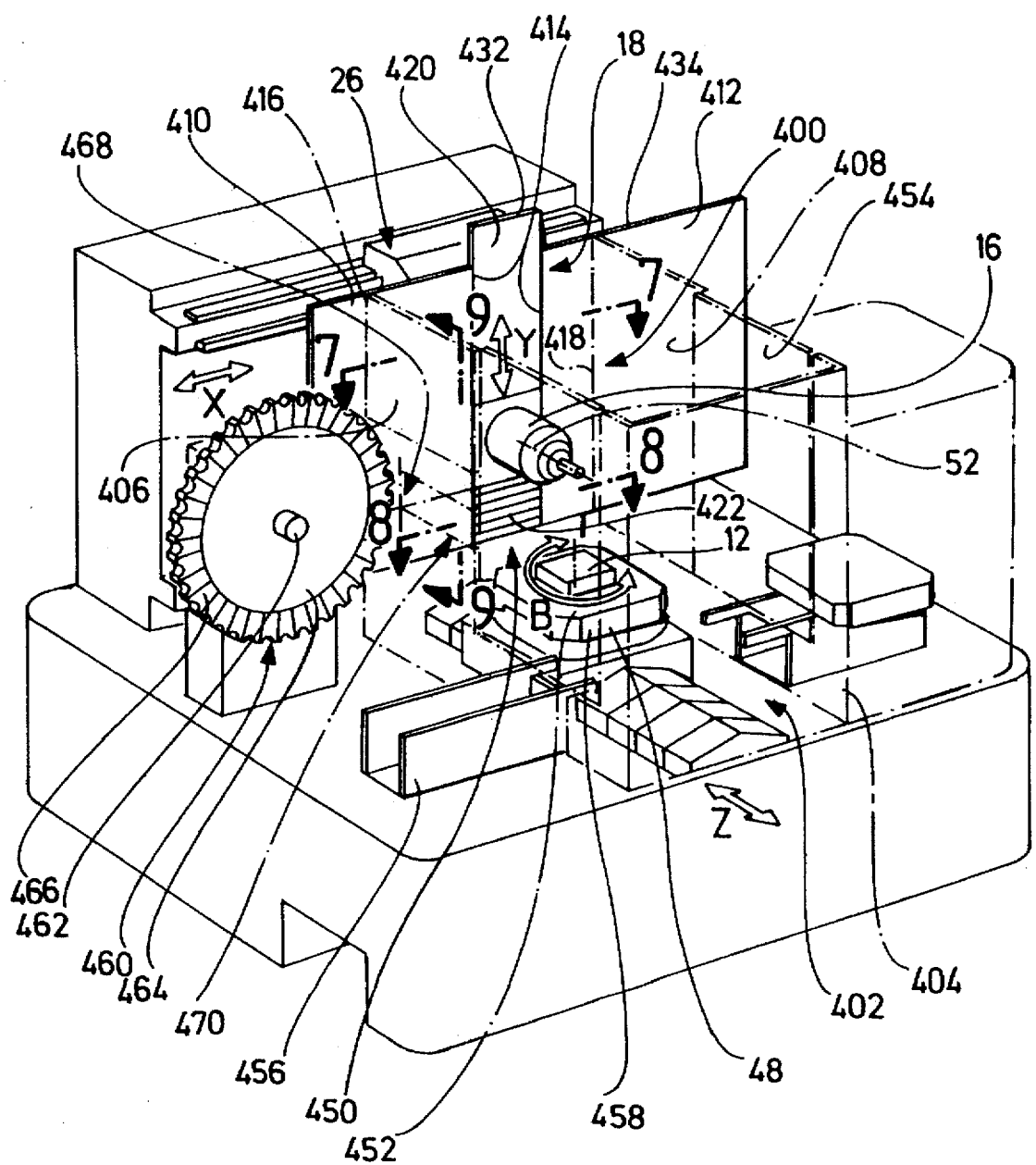
FIG. 6 a perspective illustration of a second embodiment.

In a second embodiment of an inventive machining center, illustrated in FIG. 6, a work area 400, for example, for the solution according to the first embodiment, in which machining of the workpiece 12 is carried out by the tool 14, is enclosed by a cell 402 which comprises a front wall 404 standing essentially vertical and parallel to the XY-plane and arranged opposite the tool spindle 16. The workpiece holder 48 is displaceable along the Z-axis between the front wall 404 and the Y-slide 18. The cell 402, furthermore, comprises two side walls 406 and 408 which are arranged in spaced relation to one another and between which the Z-slide designated in its entirety 42 is displaceable. These side walls 406 and 408 extend from the front wall 404 in the direction towards the Y-slide 18 which is displaceable in both the Y- and X-directions with the tool spindle 16.

A rear end of the cell 402 opposite the front wall 404 is formed by two shields 410 and 412 which are held on the X-slide 26 and extend from a movement gap 414 extending in the Y-direction for the tool spindle 16, more particularly, to such an extent in the X-direction that they rest on both sides and in all X-positions of the X-slide 26 against rear side edges 416 and 418, respectively, of the side walls 406 and 408, respectively, or project over these in the X-direction on a side facing the work area 400.

The two shields 410 and 412 are rigidly held on the X-slide 26 via a linkage, not illustrated in the drawings, and form a partly rearward end of the cell 402.

This end is supplemented by a top cover 420 in the form of a shield for closing off the movement gap 414 above the tool spindle 16 and a bottom cover 422 for closing off the movement gap 414 below the tool spindle 16.

Figure 7:
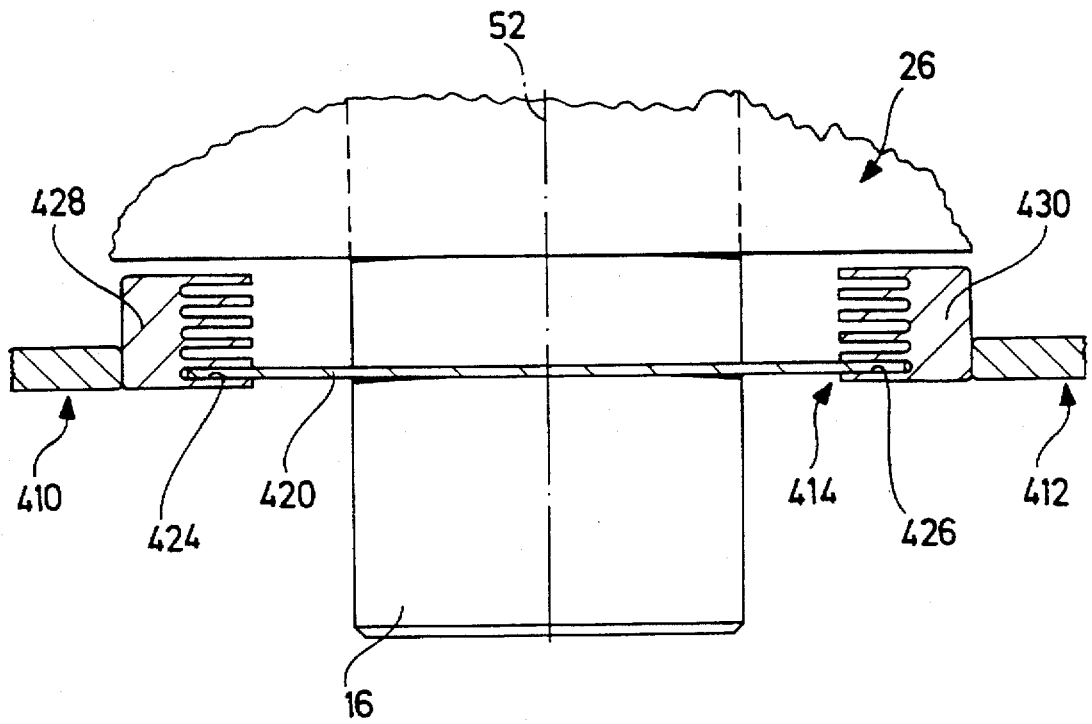
FIG. 7 a partial sectional illustration taken along line 7—7 in FIG. 6.

As illustrated in FIG. 7, the top cover 420 is a plate which is held on the Y-slide 18 and is guided in grooves 424 and 426 of edge rails 428 and 430 delimiting the movement gap 414 and extending in the Y-direction. The extent of the plate 420 is selected such that it terminates with a top edge 432 in all Y-positions of the tool spindle 16 at a top edge 434 of the shields 410 and 412 or projects upwards over these.

Figure 8:
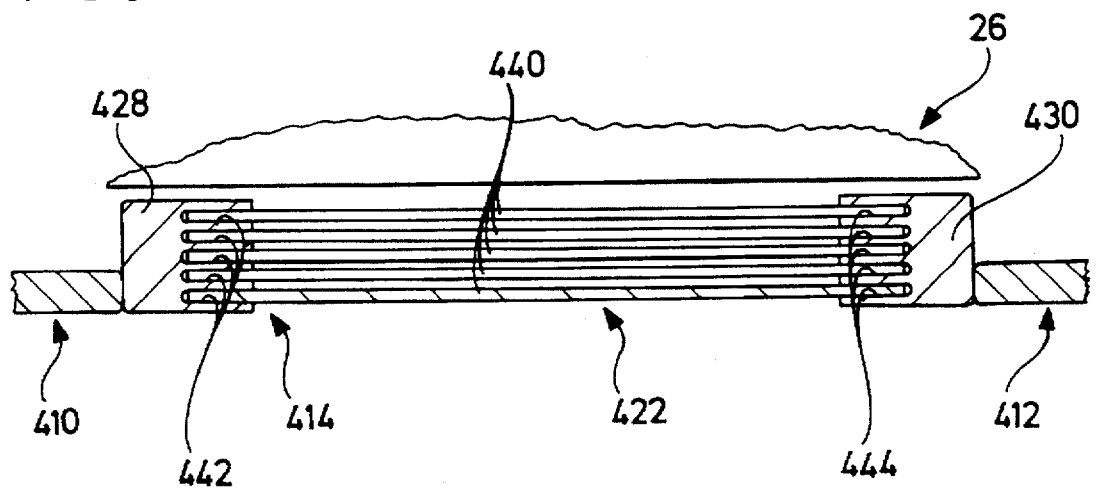
FIG. 8 a partial sectional illustration taken along line 8—8 in FIG. 6.

The bottom cover 422, on the other hand, is a so-called telescope-type cover, as illustrated in FIG. 8, which comprises a plurality of cover plates 440 which overlap one another like a telescope and are pushable over one another. The cover plates 440 are guided in a plurality of grooves 442 and 444, respectively, lying one behind the other in the Z-direction in the edge rails 428 and 430, respectively. The top one of the cover plates 440 is held on the Z-slide, while the bottom one of the cover plates 440 is connected to a bottom part 450 of the cell 402, with the bottom part 450 forming a bottom end of the cell 402.

As illustrated in FIGS. 7 and 8, the two shields 410 and 412 are light-weight building panels which comprise two outer sheets 411 extending parallel to one another and a corrugated inner sheet 413 connected between these and to these, preferably adhesively, each consisting of thin sheet metal, preferably aluminum sheet metal.

Furthermore, each of the side walls 406 and 408 is provided with a door 452 and 454, respectively, for supplying the work area 40 with a workpiece holder 48.

The respective door is located above a transportation track 456 for the workpiece holder 48, with the transportation track 456 extending at a distance from the Y-slide 18 and from a machining position 458 of the workpiece 14 parallel to the X-direction through the cell 402.

Also arranged outside of the cell 402 is a tool magazine designated in its entirety 460 and comprising a magazine wheel 464 rotatable about an axis 462, with the axis 462 preferably extending parallel to the spindle axis 52. Arranged on the circumference of this magazine wheel 464 are receptacles 466 for a plurality of tools.

The magazine wheel 464 is arranged in such a way that a transfer position 468 lies within the Y/X-range of displacement of the tool spindle 16 so that the tool spindle 16 can drive directly with the tool 14 into the transfer position 468 owing to its moveability in the Y/X-plane.

Figure 9:
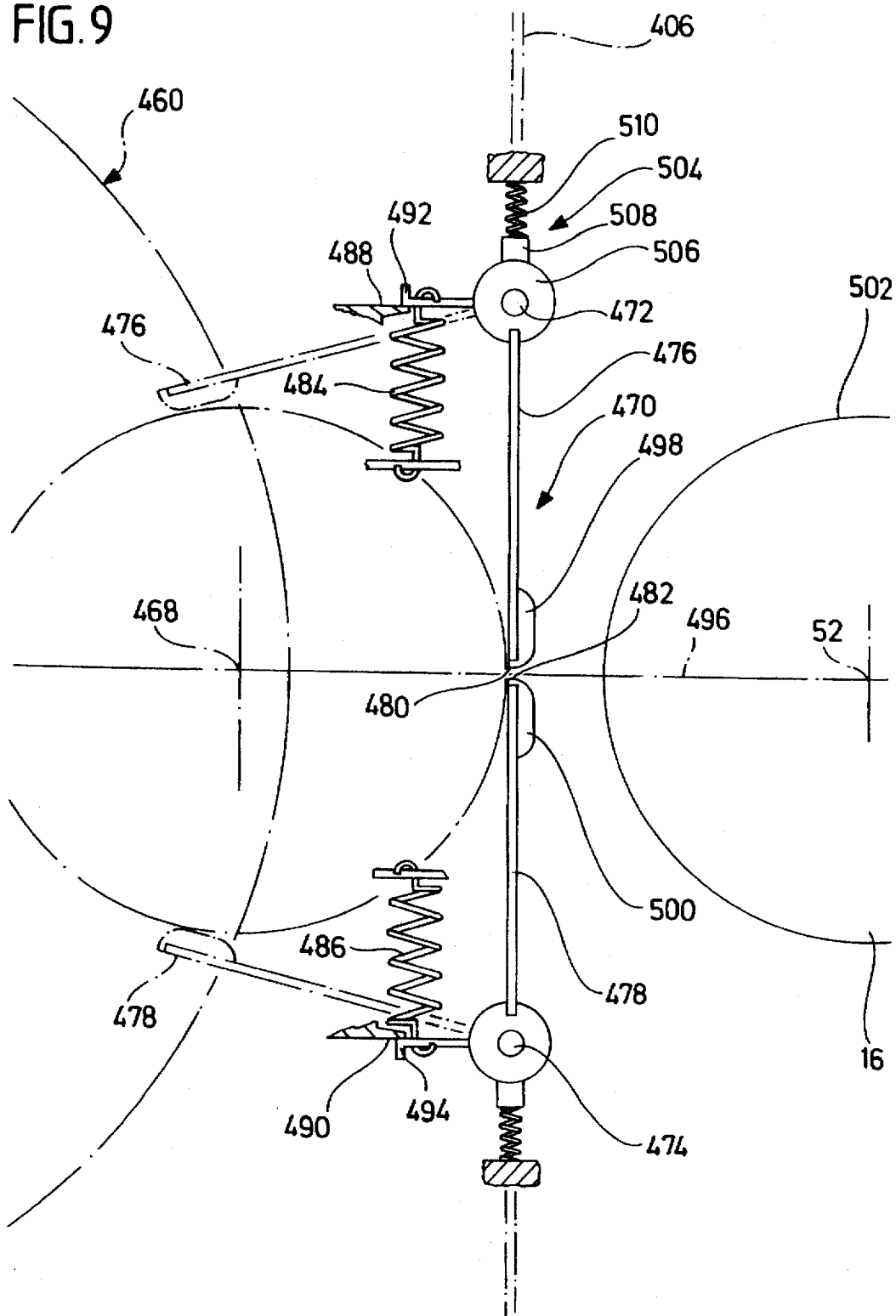
FIG. 9 a partial sectional illustration taken along line 9—9 in FIG. 6.

For this purpose there is provided in the rear region of the side wall 406 adjoining the rear edge 416 a double-swing door 470 which is illustrated in detail in FIG. 9. The double-swing door 470 comprises two door leaves 476 and 478, respectively, mounted on the side wall 406 for pivoting movement about axes 472 and 474, respectively, parallel to the Z-axis. In a closed state, the door leaves 476 and 478 have front edges 480 and 482, respectively, standing at a short distance from one another so that the cell 402 is closed when the double-swing door 470 is in the closed state. These door leaves 476 and 478 are acted upon in the direction of their closed position by two spring elements 484 and 486, the closed position being fixed by two stops 488 and 490, respectively, against which the spring elements 484 and 486 place two pivot arms 492 and 494, respectively, with the spring elements 484 and 486 preferably engaging the pivot arms.

Opening of the double-swing door 470 is brought about by the tool spindle 16 being driven into a defined Y-position 496 and then in the X-direction against the door leaves 476 and 478, for which purpose the door leaves 476 and 478 are preferably provided with damping elements 498 and 500, respectively, in the region of their front edges 480 and 482, respectively. The tool spindle 16 thus pushes with its external housing 502 each of the door leaves 476 and 478 into an open position illustrated in dot-and-dash lines in FIG. 9, moves into the transfer position 468, transfers the tool 14 and after rotation of the magazine wheel 464, removes a new tool 14 from the transfer position 468. In the transfer position 468 (illustrated by a dot-and-dash line) the tool spindle 16 stands such that its external housing 502 holds the door leaves 476 and 478 in the open position.

Each of the door leaves 476 and 478 is additionally provided with a friction brake 504 which comprises a friction wheel 506 which is fixedly connected to the respective door leaf 476 and 478, respectively, and, for its part, rests against a friction block 508 which is urged by a spring-elastic element 510 against the friction wheel 506. This prevents the two door leaves 476 and 478 from striking back in the direction of their closed position when opened quickly and also thereby ensures slow closing of the door leaves 476 and 478.

The present disclosure relates to the subject matter disclosed in German application No. P 43 07 482.0 of May 1, 1992, the entire specification of which is incorporated herein by reference.

What is claimed is:

1. A machine tool comprising:
  (a) a frame;
  (b) a workpiece holder on said frame for receiving a workpiece to be machined;
  (c) at least one slide mounted on said frame for movement with respect to said frame in the direction of at least one axis;
  (d) a tool holder mounted on said slide for receiving a tool for machining a workpiece;
  (e) a drive for moving said slide along said at least one axis, said drive including a first and second electric linear motor each aligned parallel to said at least one axis and spaced apart with at least part of said slide extending between said linear motors;
  (f) a control system for controlling the movement of said slide along said axis;
  wherein said control system comprises a first control unit for operating said first linear motor as an independent NC axis and a second control unit for operating said second linear motor as an independent NC axis whereby each motor is capable of being operated independently of the other, but simultaneously and with parallel displacement along said axis; and
  (g) a slide support for supporting said slide, said slide support having at least two sides and a front face having a geometric center, and wherein said motors are respectively arranged on said at least two sides of said slide support, so that transverse to the direction of said at least one axis, said motors are in outer regions of said slide and said slide support with respect to said front face center.

2. The machine tool as in claim 1 further comprising first and second position measuring systems respectively associated with said first and said second motors.

3. The machine tool as in claim 1 further comprising a brake for said slide.

4. The machine tool as in claim 1 wherein said motors are arranged on opposite outer sides of said slide support.

5. The machine tool as in claim 1 further comprising cooling means for at least one of said linear motors.

6. The machine tool as in claim 5 wherein said cooling means comprises a holding element for said at least one of said linear motors, said holding element having cooling channels.

7. The machine tool as in claim 6 wherein said cooling channels are coolable by flow of a coolant coolable by a cooling device.

8. A machine tool comprising:
  (a) a frame;
  (b) a first slide moveable with respect to said frame in the direction of at least one axis;
  (c) a tool spindle mounted on said first slide for receiving a tool for machining a workpiece;
  (d) a first slide support mounted on said frame and bearing said first slide, said first slide support being shaped as a yoke having a central opening through which said tool spindle extends; and
  (e) a drive for moving said first slide along said at least one axis, said drive including a first and second electric linear motor each aligned parallel to said at least one axis and spaced apart with at least part of said slide extending between said linear motors.

9. A machine tool comprising:
  (a) a frame;
  (b) a workpiece holder on said frame for receiving a workpiece to be machined;
  (c) at least one slide mounted on said frame for movement with respect to said frame in the direction of at least one axis;
  (d) a tool holder mounted on said slide for receiving a tool for machining a workpiece;
  (e) a drive for moving said slide along said at least one axis, said drive including a first and second electric linear motor each aligned parallel to said at least one axis and spaced apart with at least part of said slide extending between said linear motors;

(f) a control unit for controlling the movement of said slide along said axis; and (g) two braking devices for braking and fixing said slide, said braking devices being spaced apart in a direction transverse to said axis.

10. The machine tool as in claim 1 further comprising a workpiece holder slide retaining said workpiece holder, said workpiece holder slide displaceable in a direction transverse to said direction of at least one axis.

11. The machine tool as in claim 1 further comprising a rotary drive for rotating said workpiece holder about an axis.

12. The machine tool as in claims 11 wherein said rotary drive comprises a direct drive.

13. The machine tool as in claim 11 wherein said rotary drive further comprises a brake.

14. The machine tool as in claim 11 wherein said rotary drive comprises a rotary table whereby said workpiece holder is rotatable about a vertical axis.

15. The machine tool as in claim 14 further comprising means for fixing said workpiece holder on said rotary table and for releasing said workpiece holder from said rotary table.

16. The machine tool as in claim 1 further comprising a rotary-table slide for retaining a rotary table and a longitudinal bed in said frame for supporting said rotary-table slide, said rotary-table slide displaceable on said longitudinal bed.

17. A machine tool comprising:

(a) a frame;

(b) a workpiece holder on said frame for receiving a workpiece to be machined;

(c) at least one slide mounted on said frame for movement with respect to said frame in the direction of at least one axis;

(d) a tool holder mounted on said slide for receiving a tool for machining a workpiece;

(e) a drive for moving said slide along said at least one axis, said drive including a first and second electric linear motor each aligned parallel to said at least one axis and spaced apart with at least part of said slide extending between said linear motors;

(f) a control unit for controlling the movement of said slide along said axis;

(g) at least one primary guide guiding said slide, said primary guide disposed between said motors; and (h) at least one secondary guide guiding said slide, disposed so that one of said motors lies between said at least one primary guide and said at least one secondary guide.

18. A machine tool comprising:

(a) a frame;

(b) at least one slide mounted on said frame and being moveable with respect to said frame in the direction of at least one axis;

(c) a drive for moving said slide along said at least one axis, said drive including a first and second electric linear motor each aligned parallel to said at least one axis and spaced apart with at least part of said slide extending between said linear motors; and (d) a slide support for supporting and guiding said slide, said slide support having two opposite sides parallel to said axis with said motors respectively being arranged on each of said opposite sides.

19. The machine tool as in claim 18 wherein said slide support is shaped as a yoke.

20. The machine tool as in claim 18 wherein said slide support is part of a primary slide guided on a primary slide support shaped as a yoke.

21. A machine tool comprising:

(a) a frame;

(b) at least one slide mounted on said frame and being moveable with respect to said frame in the direction of at least one axis;

(c) at least one primary guide for guiding said slide;

(d) a drive for moving said slide along said at least one axis, said drive including a first and second electric linear motor each aligned parallel to said at least one axis and spaced apart with at least part of said slide and said primary guide extending between said linear motors, each of said motors having a primary portion on a side oriented opposite to said primary guide and a secondary portion on a side oriented toward said primary guide; and (e) at least one secondary guide for supporting said primary portion with respect to said secondary portion of at least one of said motors.

22. The machine tool as in claim 21 further comprising control means for operating said motors jointly as a single NC axis.

23. The machine tool as in claim 21 further comprising control means for operating each motor independently as an NC axis, but simultaneously and with parallel displacement along said axis.

24. The machine tool as in claim 23 further comprising first and second position measuring systems respectively associated with said first and said second motors.

25. The machine tool as in claim 21 further comprising a slide support for supporting said slide, said slide support having at least two sides and a front face having a geometric center, and wherein said motors are respectively arranged on said at least two sides of said slide support, so that transverse to the direction of said at least one axis, said motors are in outer regions of said slide and said slide support with respect to said front face center.

26. The machine tool as in claim 25 wherein said motors are arranged on opposite outer sides of said slide support.

27. The machine tool as in claim 21 further comprising cooling means for at least one of said linear motors.

28. The machine tool as in claim 27 wherein said cooling means comprises a holding element for said at least one of said linear motors, said holding element having cooling channels.

29. The machine tool as in claim 8 further comprising a second slide bearing said first slide support and further comprising a second slide support guiding said second slide, said second slide support being shaped as a yoke having a central opening through which said tool spindle extends.

* * * * *